United States Patent
D'Alessio et al.

(10) Patent No.: US 12,145,326 B2
(45) Date of Patent: Nov. 19, 2024

(54) ANTI-MICROBIAL FIBER REINFORCED PLASTIC

(71) Applicant: B/E Aerospace, Inc., Winston-Salem, NC (US)

(72) Inventors: Bradford D'Alessio, Winston-Salem, NC (US); Thomas Martz, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 1041 days.

(21) Appl. No.: 17/010,330

(22) Filed: Sep. 2, 2020

(65) Prior Publication Data

US 2022/0063212 A1    Mar. 3, 2022

(51) Int. Cl.
| | |
|---|---|
| *B29C 70/14* | (2006.01) |
| *B29C 70/20* | (2006.01) |
| *B29C 70/22* | (2006.01) |
| *B64D 11/06* | (2006.01) |
| *B29K 101/00* | (2006.01) |
| *B29K 305/08* | (2006.01) |
| *B29K 305/10* | (2006.01) |
| *B29L 31/30* | (2006.01) |

(52) U.S. Cl.
CPC .............. *B29C 70/14* (2013.01); *B29C 70/20* (2013.01); *B29C 70/22* (2013.01); *B64D 11/0638* (2014.12); *B29K 2101/00* (2013.01); *B29K 2305/10* (2013.01); *B29K 2305/14* (2013.01); *B29L 2031/3026* (2013.01); *B29L 2031/3076* (2013.01)

(58) Field of Classification Search
CPC ..... B64D 11/0638; B29C 70/20; B29C 70/22; B29C 70/14
See application file for complete search history.

(56) References Cited

U.S. PATENT DOCUMENTS

| | | |
|---|---|---|
| 5,753,174 A | 5/1998 | Shimizu et al. |
| 9,132,576 B2 | 9/2015 | Crudden et al. |
| 10,053,577 B2 | 8/2018 | Strubl et al. |
| 2015/0364824 A1 | 12/2015 | Song et al. |
| 2018/0027987 A1 | 2/2018 | Calhoun et al. |
| 2019/0150622 A1 | 5/2019 | Bobba et al. |
| 2019/0210320 A1 | 7/2019 | Fette et al. |

(Continued)

FOREIGN PATENT DOCUMENTS

| | | |
|---|---|---|
| CN | 106633405 A | 5/2017 |
| CN | 106633575 A | 5/2017 |

(Continued)

OTHER PUBLICATIONS

Extended Search Report for European Application No. 21193908.7 dated Jan. 17, 2022, 9 pages.

*Primary Examiner* — Anthony D Barfield
(74) *Attorney, Agent, or Firm* — Suiter Swantz IP

(57) ABSTRACT

In-aircraft seats include plastic components having anti-microbial, metallic reinforcing fibers such as copper or silver. Copper or silver wires are embedded into the plastic at the time or molding to provide both structural reinforcement and anti-microbial properties. At the time of molding, copper or silver wires are disposed in a plastic mold prior to plastic application to ensure the metallic wires are generally disposed toward the surface of the molded part.

7 Claims, 4 Drawing Sheets

(56) References Cited

U.S. PATENT DOCUMENTS

2019/0291870 A1  9/2019 Hall
2020/0031018 A1  1/2020 Sung et al.

FOREIGN PATENT DOCUMENTS

| | | | | | |
|---|---|---|---|---|---|
| CN | 106750961 | A | | 5/2017 | |
| CN | 106750963 | A | | 5/2017 | |
| CN | 106750965 | A | | 5/2017 | |
| CN | 106751102 | A | | 5/2017 | |
| CN | 106751105 | A | | 5/2017 | |
| CN | 206187350 | U | * | 5/2017 | |
| CN | 106832645 | A | | 6/2017 | |
| CN | 107641223 | A | | 1/2018 | |
| CN | 110697050 | A | * | 1/2020 | |
| CZ | 2512538 | B6 | | 2/2017 | |
| IN | 321624 | B | | 9/2019 | |
| KR | 100636403 | B1 | | 10/2006 | |
| NL | 8000093 | A | * | 7/1980 | ............. A47C 7/185 |

* cited by examiner

ANTI-MICROBIAL FIBER REINFORCED PLASTIC

BACKGROUND

Aircraft interiors are confined spaces and may expose passengers to harmful microbes and illnesses. Without passive controls, these harmful microbes may grow and spread between active cleanings, leading to an increase in infections inside aircraft. With no ability to actively clean the interior during service, either chemically or with UV, illness may be spread from passenger to passenger.

SUMMARY

In one aspect, embodiments of the inventive concepts disclosed herein are directed to in-aircraft seats with plastic components having anti-microbial, metallic reinforcing fibers such as copper or silver. Copper or silver wires are embedded into the plastic at the time or molding to provide both structural reinforcement and anti-microbial properties.

In a further aspect, at the time of molding, copper or silver wires are disposed in a plastic mold prior to plastic application to ensure the metallic wires are generally disposed toward the surface of the molded part.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
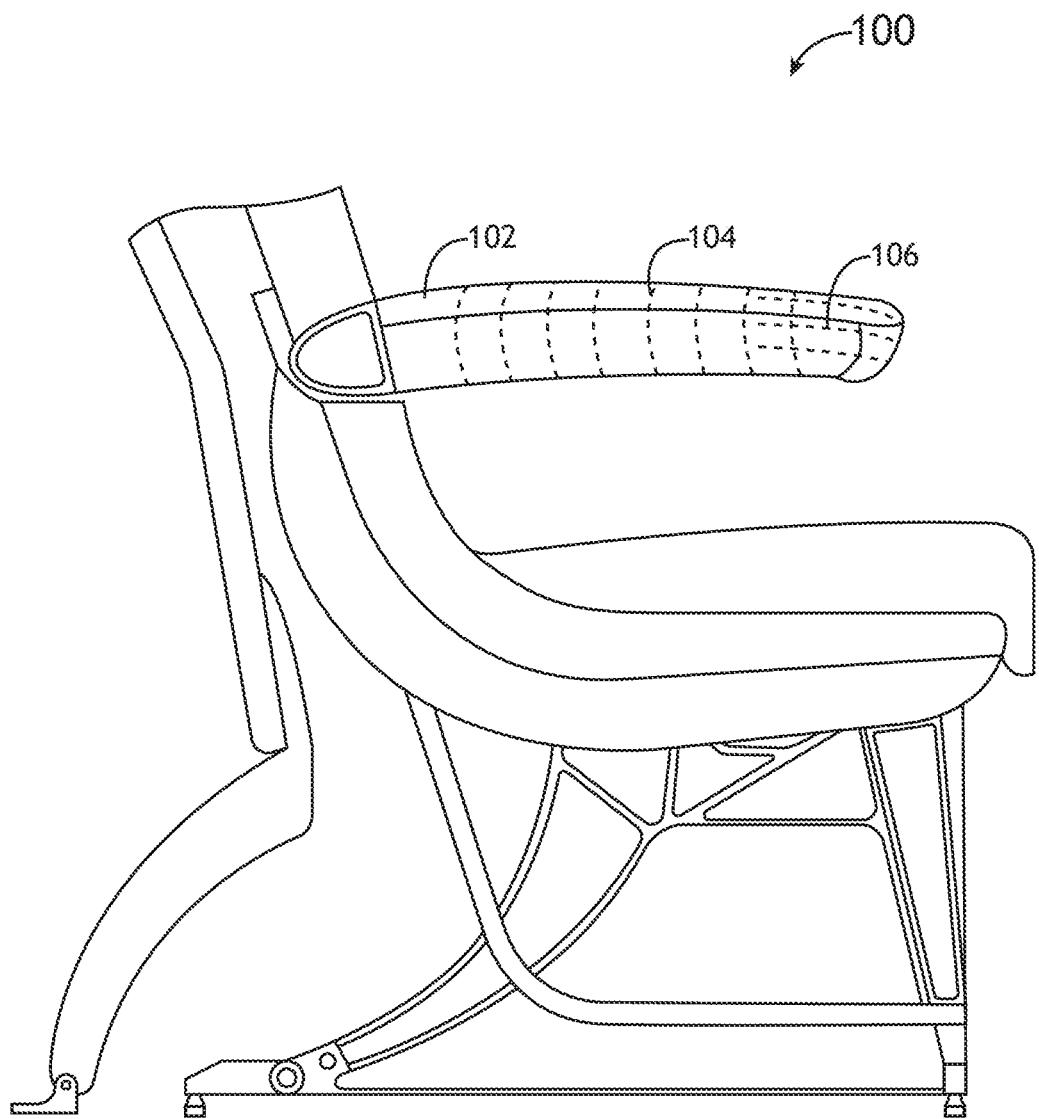
FIG. 1 shows a partial, side, environmental view of an aircraft seat including an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to in-aircraft seats with plastic components having anti-microbial, metallic reinforcing fibers such as copper or silver. Copper or silver wires are embedded into the plastic at the time or molding to provide both structural reinforcement and anti-microbial properties.

Referring to FIG. 1, a partial, side, environmental view of an aircraft seat 100 including an exemplary embodiment is shown. The aircraft seat 100 includes elements such as armrests 102 that include plastic parts. At the time of molding, the plastic parts are molded with metallic wires 104, 106 having anti-microbial properties. The wires 104, 106 are disposed or injected during the molding process to bias the location of the wires 104, 106 toward a passenger contact surface. For example, wires 104, 106 may be placed in a mold during a rotational molding processes before plastic injection such that centrifugal force during curing biases the wires 104, 106 toward an exterior surface. Similarly, wires 104, 106 may be disposed in a mold before injection molding or compression molding. In at least one embodiment, wires 104, 106 may be added to plastic before blow molding, extrusion molding, or thermoforming.

In at least one embodiment, where plastic parts are molded via rotational molding, a billet of plastic or resin is covered with anti-microbial metallic wires 104, 106 in an orientation defined by the spin of the mold and the placement of the billet such that when the billet is heated and spun to press into the mold via centrifugal force, the anti-microbial metallic wires 104, 106 will be disposed on the outer surface of the finished product in an orientation along an axis for the desired reinforcement.

In at least one embodiment, where the plastic parts are molded via injection molding, the molding material may be too small and inconsistently orientated to prepare the molding material with anti-microbial metallic wires 104, 106 before injection. In such embodiments, the mold may be coated with a resin including the anti-microbial metallic wires 104, 106. Alternatively, a separate fabricated plastic film including the anti-microbial metallic wires 104, 106 may be placed in the mold cavity prior to injection.

In at least one embodiment, re the plastic parts are molded via blow molding or thermoforming, sheets of material may be specially prepared with anti-microbial metallic wires 104, 106 embedded in a desired orientation such that during the molding process, the anti-microbial metallic wires 104, 106 end up in the desired orientation. Furthermore, blow molding and thermoforming may produce a plastic veneer that may be further formed via the introduction of internal, non-reinforced parts so that the anti-microbial metallic wires 104, 106 are concentrated at the surface of the part where customer contact is most likely.

In at least one embodiment, parts may be produced and then covered via a deposition process with anti-microbial metallic wires 104, 106 in a curable resin.

In at least one embodiment, wires 104, 106 may be orientated according to the forces or tension applied to the plastic element. For example, a first set of wires 14 may be generally oriented to longitudinally around the armrest 102 while a second set of wires 106 may be oriented latitudinally about the end hand rest of the armrest 102.

Figure 2:
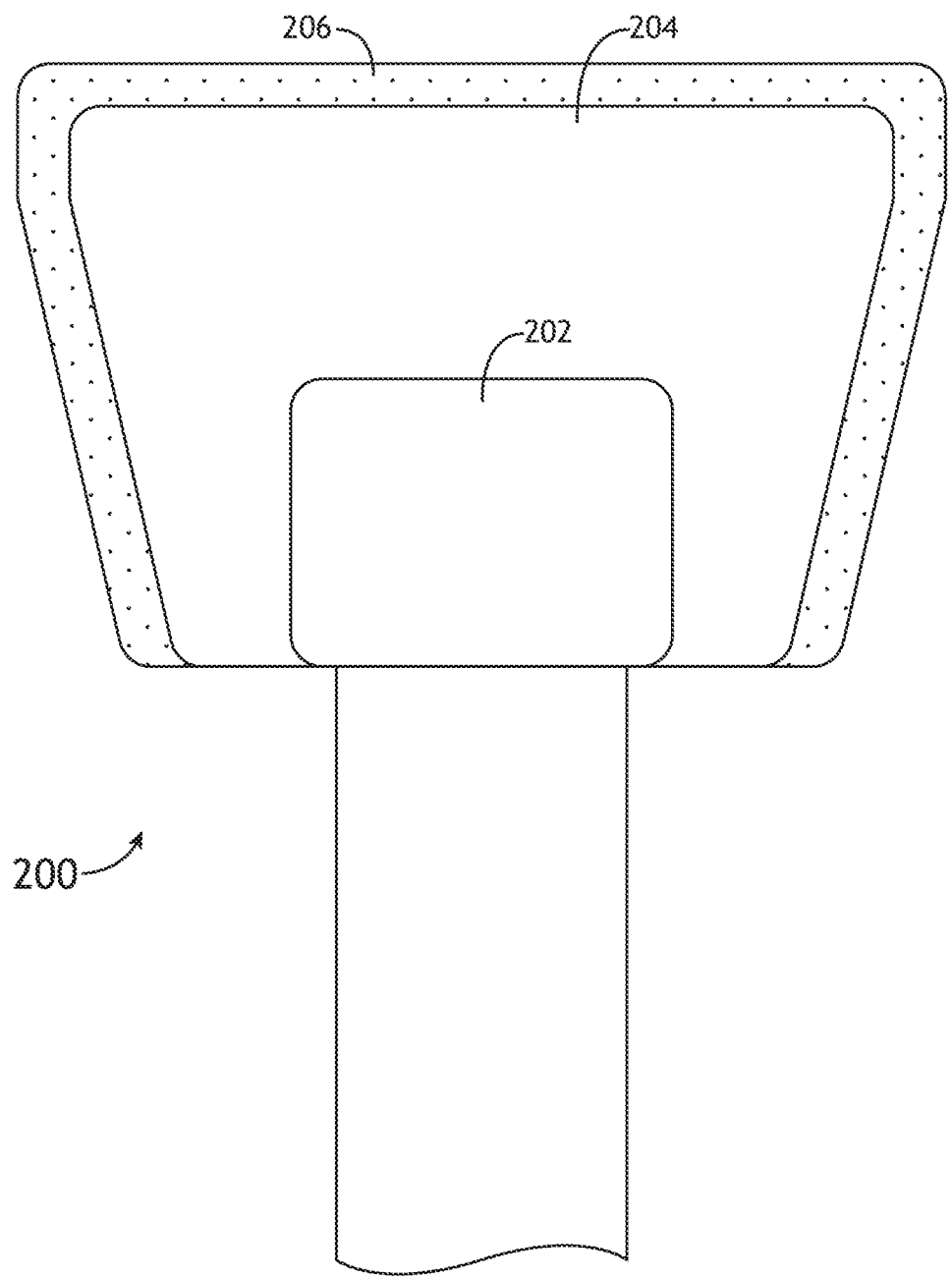
FIG. 2 shows a detail, cross-sectional view of an aircraft armrest including an exemplary embodiment.

Referring to FIG. 2, a detail, cross-sectional view of an aircraft armrest 200 including an exemplary embodiment is shown. The armrest 200 may comprise a central support element 202 such as an aluminum core. A foam or plastic filler 204 may surround the central support element 202 and a plastic sheath 206 having anti-microbial metallic wire reinforcement surrounds the filler 204. A separate plastic sheath 206 may ensure that the anti-microbial metallic wire reinforcement contacts the passenger's arm if the metallic sheath 206 has a thickness on the same order as the diameter of the metallic wire reinforcement.

Figure 3:
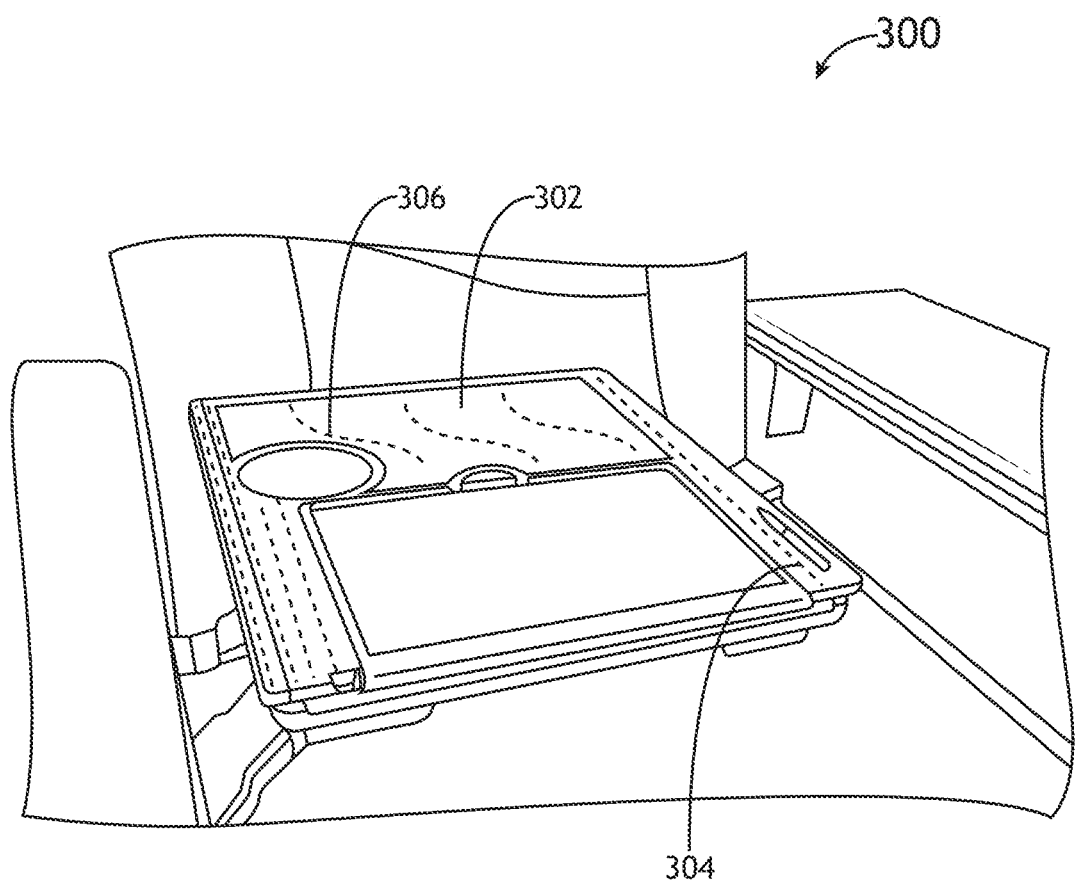
FIG. 3 shows a partial, perspective, environmental view of an aircraft tray table including an exemplary embodiment.

Referring to FIG. 3, a partial, perspective, environmental view of an aircraft tray table 300 including an exemplary embodiment is shown. The tray table 300 has plastic contact surfaces 302 with wire reinforcement 304, 306. The wire reinforcement 304, 306 comprises metallic wires having anti-microbial properties such as copper and silver. The wire reinforcements 304, 306 may be oriented to provide structural reinforcement along known axes that experience significant strain. Alternatively, or in addition, the wire reinforcement 304, 306 may be disposed to maximize surface area coverage in areas where passenger contact is more likely, such as around grip portions or areas where a latch is released.

Figure 4:
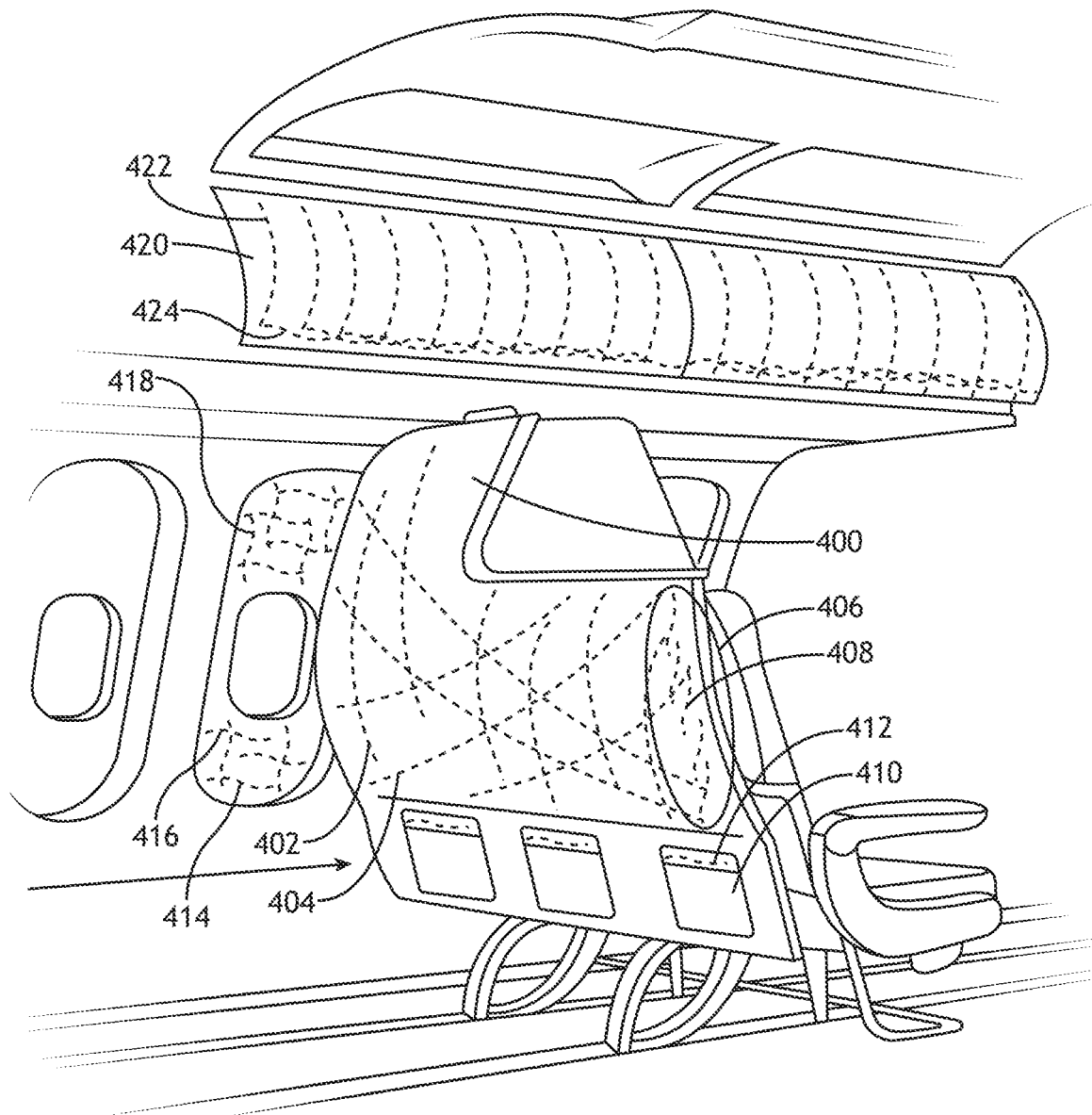
FIG. 4 shows a perspective, environmental view of an aircraft cabin including exemplary embodiments.

Referring to FIG. 4, a perspective, environmental view of an aircraft cabin including exemplary embodiments is shown. Plastic seat back covering elements 400 may include anti-microbial wire reinforcements 402, 404. The anti-microbial wire reinforcements 402, 404 may be oriented along axes of increased strain, or along several axes to generally enhance the structural integrity of the plastic seat back covering element 400. In at least one embodiment, high contact areas 406 may include additional high-density wires 408 configured to maximize passenger contact.

Such plastic seat back covering elements 400 may include pockets 410 for passenger use. Such pockets 410 often include a plastic element 412 disposed at the opening. That plastic element 412 may comprise anti-microbial wire reinforcement disposed to maximize passenger contact.

In at least one embodiment, the cabin may include plastic window surrounding elements 414. Such plastic window surrounding elements 414 may include anti-microbial wire reinforcements 416, 418. Such anti-microbial wire reinforcements 416, 418 may be oriented along one or more axes to enhance the structural integrity of the plastic window surrounding elements 414 and/or to maximize passenger contact.

In at least one embodiment, overhead bins 420 may comprise plastic surface elements. Those plastic surface elements may comprise anti-microbial wire reinforcements 422, 424 disposed to enhance structural integrity and to maximize passenger contact. In at least one embedment, a first set of anti-microbial wire reinforcements 422 may be disposed primarily to enhance structural integrity in areas with minimal passenger contact while a second set of anti-microbial wire reinforcements 424 are disposed in high contact areas.

It may be appreciated that the addition of metallic wire reinforcement may allow for thinner, lighter parts. Furthermore, while the length of the metallic wire reinforcement may be application dependent, lengths of less than a millimeter up to twenty millimeters are envisioned. Anti-microbial wire reinforcement may slow or prevent the growth of microbes as well as possibly reducing their population with enough exposure and time. With optimized sizing, additional strength can be added to the material.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft seat including a plurality of plastic components including at least an armrest, produced by a method comprising:

disposing a plurality of metallic wires reinforcements in a mold, the metallic wire reinforcements comprising anti-microbial properties; and molding a plastic component via one of rotational molding, wherein:

the plurality of metallic wires reinforcements are disposed in the mold to be concentrated toward an outer surface of the plastic component via centrifugal force; and a first set of metallic wire reinforcements are disposed longitudinally around the armrest to reinforce the armrest along a first axis and a second set of metallic wire reinforcements are disposed latitudinally around a handrest portion of the armrest to reinforce the plastic component along a second axis.

2. The aircraft seat of claim 1, wherein the metallic wire reinforcement comprises copper wire or silver wire.

3. The aircraft seat of claim 1, wherein the metallic wire reinforcement is oriented along an axis of increased strain in each of the plurality of plastic components.

4. The aircraft seat of claim 1, wherein the metallic wire reinforcement disposed to maximize surface contact with a passenger.

5. The aircraft seat of claim 1, wherein the metallic wire reinforcement comprises the first set of metallic wire reinforcements disposed through the entire surface of the corresponding plastic component and the second set of metallic wire reinforcements disposed in areas of high passenger contact.

6. The aircraft seat of claim 1, wherein the plurality of plastic components comprises a seat pocket opening reinforcement.

7. The aircraft seat of claim 1, wherein the plurality of plastic components comprises a tray table.

* * * * *